United States Patent [19]

Miyagi

[11] Patent Number: 4,641,197

[45] Date of Patent: Feb. 3, 1987

[54] IMAGE PROCESSING METHOD OR APPARATUS

[75] Inventor: Ken Miyagi, Yokohama, Japan

[73] Assignee: Canon Kabushiki Kaisha, Tokyo, Japan

[21] Appl. No.: 624,795

[22] Filed: Jun. 26, 1984

Related U.S. Application Data

[63] Continuation of Ser. No. 314,442, Oct. 23, 1981.

[30] Foreign Application Priority Data

| Oct. 30, 1980 | [JP] | Japan | 55-152794 |
| Oct. 30, 1980 | [JP] | Japan | 55-152795 |
| Oct. 30, 1980 | [JP] | Japan | 55-152797 |

[51] Int. Cl.$^4$ .......................................... H04N 1/387
[52] U.S. Cl. ..................................... 358/280; 358/256; 358/287; 358/903; 364/523
[58] Field of Search ............... 358/280, 256, 287, 903; 364/523

[56] References Cited

U.S. PATENT DOCUMENTS

| 3,597,071 | 7/1971 | Jones | 355/11 |
| 3,976,982 | 8/1976 | Eiselen | 358/287 |
| 4,149,145 | 4/1979 | Hartke | 358/280 |
| 4,196,450 | 4/1980 | Miller | 364/523 |
| 4,213,694 | 7/1980 | Kuseski | 355/77 |
| 4,214,276 | 7/1980 | Pugsley | 358/256 |
| 4,231,069 | 10/1980 | Wellendorf | 358/256 |
| 4,240,119 | 12/1980 | Norton | 358/280 |
| 4,264,808 | 4/1981 | Owens | 358/256 |
| 4,326,222 | 4/1982 | Connin | 358/285 |

Primary Examiner—Howard W. Britton
Attorney, Agent, or Firm—Fitzpatrick, Cella, Harper & Scinto

[57] ABSTRACT

An image processing method comprises the steps of storing document image data in a memory, operating on input character image data, and processing one of the document image data and the character image data in such manner as to reproduce the other image data in an area other than the area allocated for reproducing the one image.

36 Claims, 17 Drawing Figures

IMAGE PROCESSING METHOD OR APPARATUS

This application is a continuation of application Ser. No. 314,442 filed Oct. 23, 1981 now abandoned.

BACKGROUND OF THE INVENTION

1. Field of the Invention

The present invention relates to an image data processing method and apparatus.

2. Description of the Prior Art

A typical example of an image processing apparatus according to the prior art is illustrated in FIG. 1.

An original 1 is read by an image reader 3 and the image is converted into a digital signal. The digital signal of the original image is stored in an image memory 4. The image data are provisionally transferred into an external sub-memory such as disk 5 to form a data file for further processing the data for editing.

Processing for editing is carried out in an image processor 6. The image processor extracts a necessary portion of data from the data in the external sub-memory 5 and determines the arrangement of images finally required. After determining the image arrangement, the data are transferred into the image memory 4. The work necessary for image arrangement and confirmation of the determined arrangement is conducted by using an input-output apparatus of a display 8 and a writing pen 9. Data already processed and transferred into the image memory 4 are sent out to an image printer 7 where the processed image data are printed out as a record 2.

In the prior art apparatus of the type mentioned above, an image processed record can be obtained only from the original image already read out by the image reader. It is difficult to add other image data afterwards. Although such addition of other data is not impossible, it involves very complicated operations for determining the edited layout, in addition to the operations for reading the original and inputting other image data to be added.

Another disadvantage of the above prior art apparatus is the difficulty in making necessary corrections. For example, if there is any miswritten word in the original document or if any dirty letters are found in the original document or if the layout of sentences determined by image processing is different from that of the original document, it is desirable to put the necessary correction in the document portion. However, in the prior art apparatus, such correction is not generally possible. Even if possible, a very long time is required to make the corrections, which in turn reduces the efficiency of the operation to a great extent.

The use of a sub-memory such as disk results in a drawback. The speed of data transfer in the forward direction and the backward direction is limited by the operation speed of such disk memory. High speed processing is not attainable. Furthermore, the use of an external sub-memory necessitates time and labour consuming registration and reference.

Since, in the conventional apparatus, a plural number of document images are continuously copied, it is required to carry out the exchange of documents in synchronism with the continuous copying operation. This makes the apparatus very complicated.

SUMMARY OF THE INVENTION

Accordingly, it is a primary object of the invention to provide an image processing method and apparatus which eliminates the above disadvantages and drawbacks of the prior art.

It is a more specific object of the invention to provide an improved image processing method and apparatus which permits combination of an image read from a document and a word image independently input.

It is another object of the invention to provide an image processing method and apparatus which permits edition of images with higher efficiency.

It is a further object of the invention to provide an image processing method and apparatus in which the position or area where one set of image data is reproduced never interferes with the position or area for another set of image data.

It is still a further object of the invention to provide an image processing apparatus in which image data can be processed at high speed and therefore with improved efficiency.

It is also an object of the invention to provide a copying method and apparatus which permits printing of images of a plural number of pages of a document serially.

It is a further object of the invention to provide a method and apparatus which permits copying of images on both side surfaces of a sheet.

Other and further objects, features and advantages of the invention will appear more fully from the following description of preferred embodiments with reference to the accompanying drawings.

BRIEF DESCRIPTION OF THE DRAWINGS

FIGS. 4-1 and 4-2 are detailed views of the control circuit in the apparatus shown in FIG. 2;

FIGS. 5-1 and 5-2 are flow charts of the control;

FIG. 5-3 is an illustration of coordinate-address conversion;

FIGS. 8-1 and 8-2 show a copy obtained therefrom;

DESCRIPTION OF THE PREFERRED EMBODIMENTS

Figure 2:
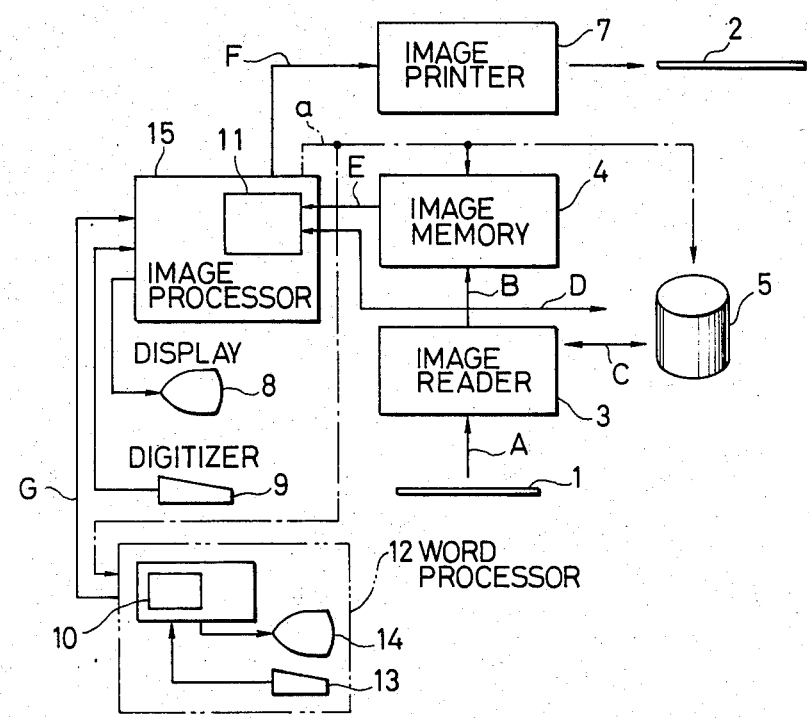
FIG. 2 is a diagrammatic view of an image processing apparatus according to the present invention showing a preferred embodiment.

Referring to FIG. 2 showing an embodiment of the present invention, reference numeral 1 designates an original which may be, for example, a photograph of an object. Reference numeral 3 is an image reader for reading the original 1 and converting the images so read into digital signals. The image reader 3 comprises a known line scanner such as a CCD and a driving apparatus for moving the scanner in the secondary scan direction. Image data read by the image reader 3 are stored in an image memory 4. The image memory 4 comprises a known semiconductor page memory having capacity great enough to store image data for one page. 5 is an external sub-memory for storing a large amount of data from the image memory 4 as a data file. The external sub-memory 5 comprises a known magneto disk and means for providing access to it. 12 is a known word processor for producing a sentence. The word processor 12 contains a keyboard 13, a display 14 and a sentence memory 10. The sentence memory 10 comprises a known semiconductor memory having capacity great enough to store an amount of data corresponding to one page of print. 15 is an image processor for compounding and editing data from the image memory 4, external sub-memory 5 and word processor 12. The image processor also performs editing of sentence data from the word processor 12 for starting a new paragraph at the same time. The image processor 15 contains an edited data memory 11 comprising a known semiconductor memory. The content of the edited data memory 11 corresponds to the final print image then desired. 7 is an image printer for printing out the data processed by the image processor. The image printer may be a known laser printer. 2 designates a record having edited images thereon. Reference characters A, B, C, D, E, F and G designate data buses for images and sentences. The data bus G is also useful for data communication through a communication circuit. Reference characters a designates a control signal line for controlling every part selection of the part etc. Other parts of the apparatus correspond to those of the apparatus shown in FIG. 2 and need not be further described.

Figures 1, 5:
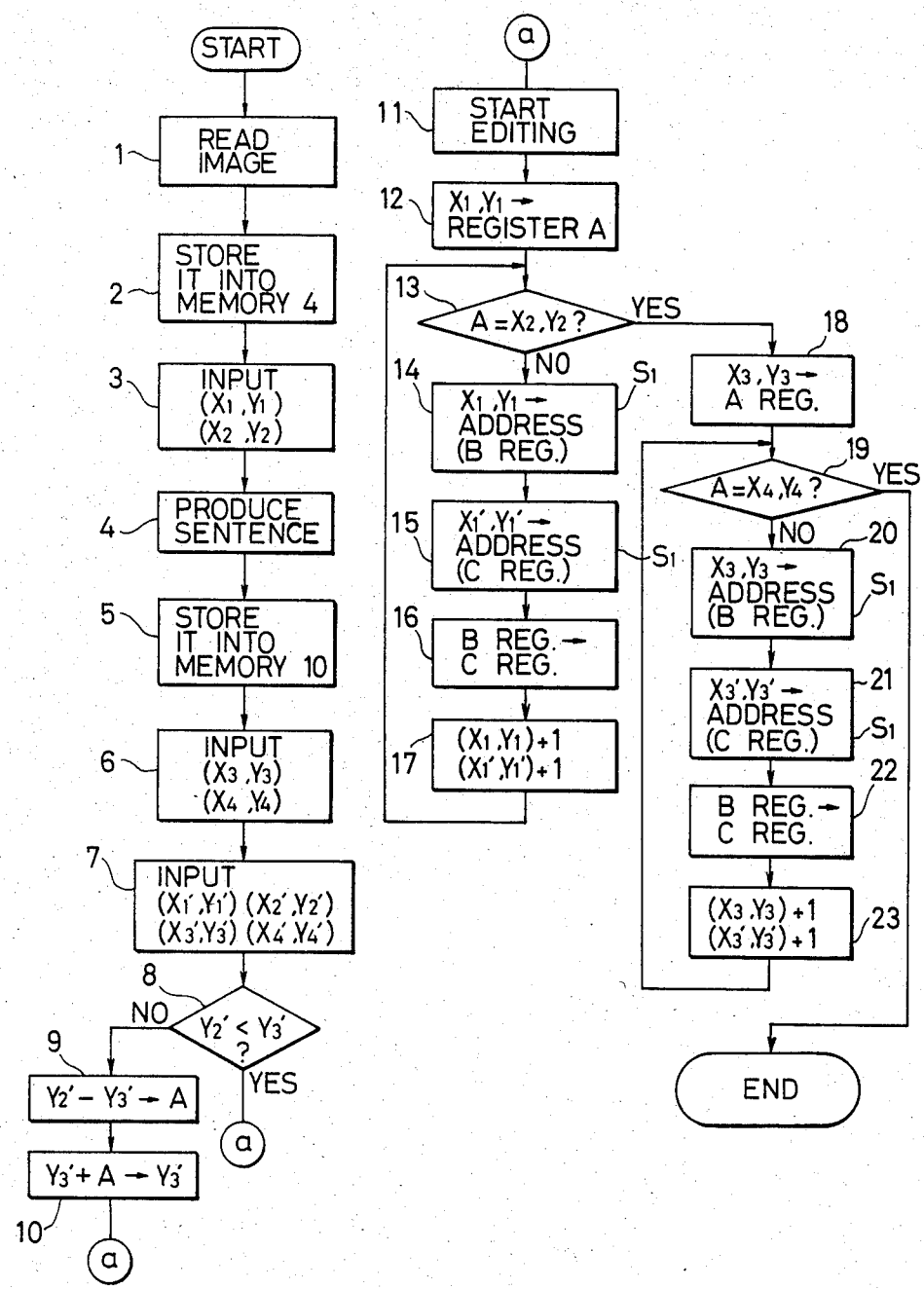
Figures 2, 5:
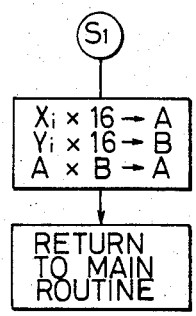
Figures 3, 5:
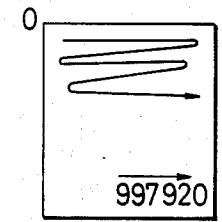

FIG. 3 illustrates the manner of image editing employing the embodiment shown in FIG. 2.

Figure 3A:
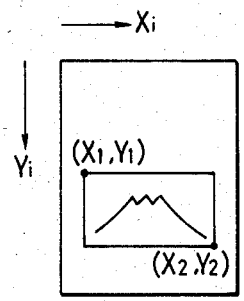
FIGS. 3A, 3B and 3C illustrate an examples of image edition.
Figure 3B:
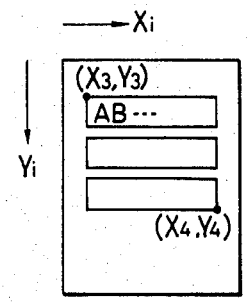
Figure 3C:
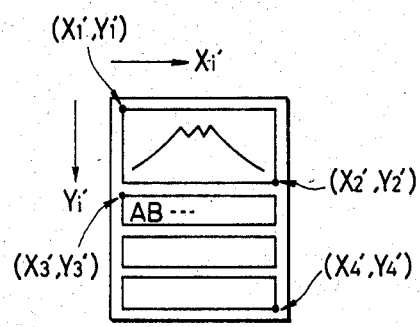

FIG. 3A shows an original image such as a photograph or a figure to be read by the image reader 3. Xi and Yi indicate the position and area of the original image. FIG. 3B shows a sentence produced by the word processor 12. The sentence thus produced is stored in the sentence memory 10. FIG. 3C shows an example of the layout of the image and the sentence as required after image edition. The manner of operation of the apparatus for this example is as follows:

The image reader 3 shown in FIG. 2 reads the original picture image shown in FIG. 3A. The image memory 4 stores the image data. The image area and its position, Xi and Yi correspond to (X1, Y1)(X2, Y2) of the image memory. White and black portions of the image are stored as "0" and "1", respectively. If the image is to be stored for a long time, then it is transferred into the external sub-memory 5 to keep it in memory as a data file.

The sentence data shown in FIG. 3B is data produced by the word processor 12. A complete sentence is an example of such sentence data. The data is entered by the keyboard 13 as character codes. After composing a complete sentence, for example, the data is stored at (X3, Y3), (X4, Y4) in the sentence memory 10 shown in FIG. 2.

The image processor 9 in FIG. 2 converts Xi and Yi indicating the image position and area into the coordinates of (X'1, Y'1), (X'2, Y'2) and then determines the coordinates of the sentence insertion area (X'3, Y'3), (X'4, Y'4) to obtain the final image arranged as shown in FIG. 3C. This processing is carried out in the following manner.

As previously described, the image processor 15 contains an edited data memory designated by 11. The converted coordinate positions are allocated to the corresponding positions of the memory 11 so that the positions for arrangement of the image data and the sentence data are determined. The image processor 15 dispatches a processing instruction signal a to transfer the image data existing between the areas (X1, Y1) and (X2, Y2) from the image memory 4 or the external sub-memory 5 into the area (X'1, Y'1)(X'2, Y'2) in the edited data memory 11 through the data bus E.

As for the sentence data, the image processor 15 calculates and evaluates the number of characters existing in the insertion area in the edited data memory 11 defined by (X'3, Y'3) and (X'4, Y'4). Then, it indicates the number of characters which can be transferred up to the point (X'4, Y'4). This prevents any character image from entering the area of the read image. Thereafter, the image processor 15 transfers data to the above-defined area in the memory 11 from the sentence memory 10 in the word processor 12 through data bus G while starting a new line without changing the number of characters in one line by the new line starting function of the image processor 15. In this manner, the position for reproducing the read image can be determined with first priority. Also, it is made possible to edit the character image in an area other than the area used for editing the read image.

After the above processing and editing, the edited data memory 11 has the corresponding image data and sentence data at the determined positions and in the determined areas corresponding to X'i and Y'i. This content of the memory 11 is transferred to the image printer 7 through the data bus F. Thus, an edited image record 2 can be obtained.

The above embodiment will be described further in detail hereinafter with reference to FIGS. 4 and 5.

Figure 1:
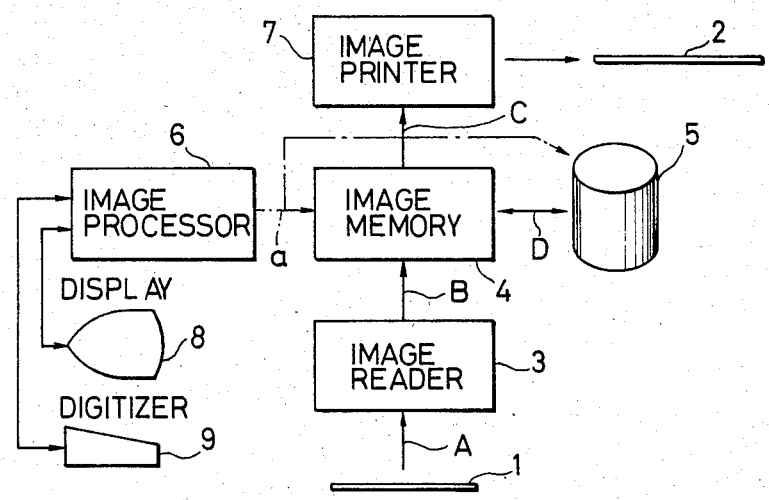
FIG. 1 is a diagrammatic view of an image processing apparatus according to the prior art.
Figures 1, 4:
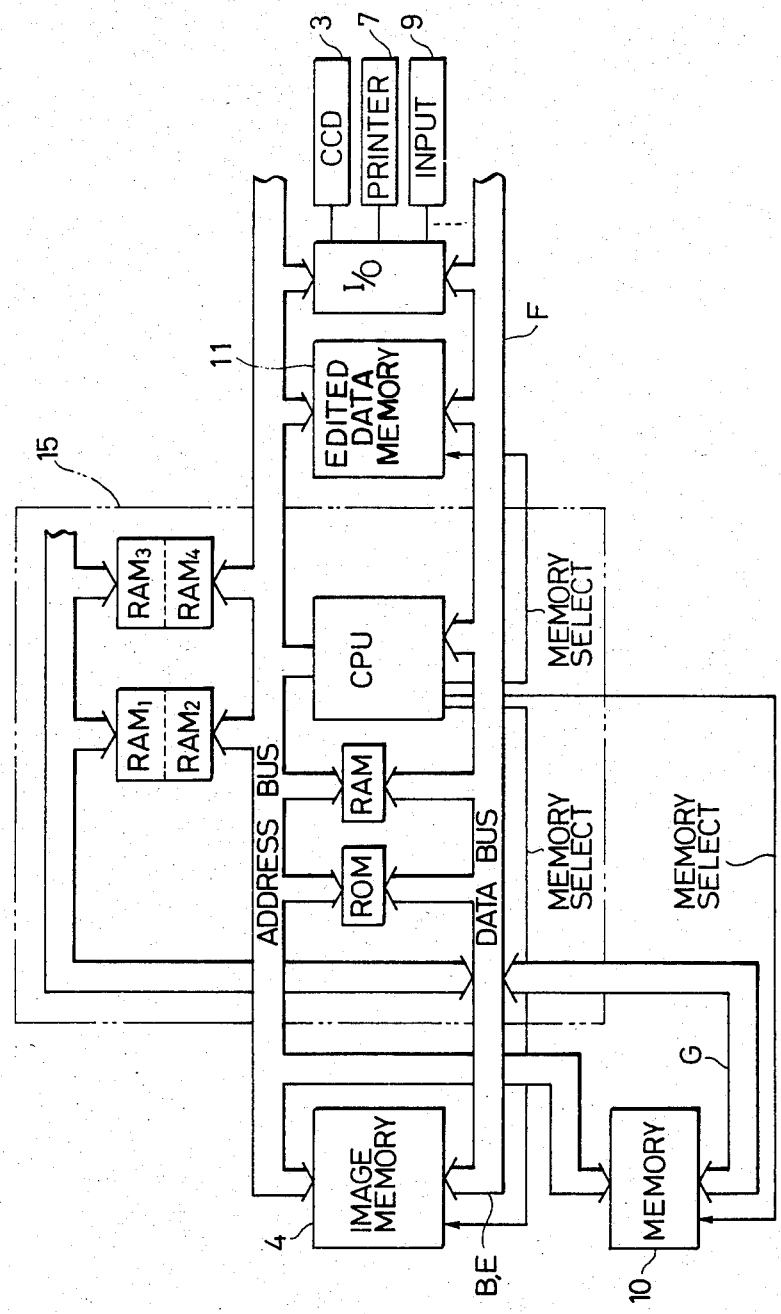
Figures 2, 4:
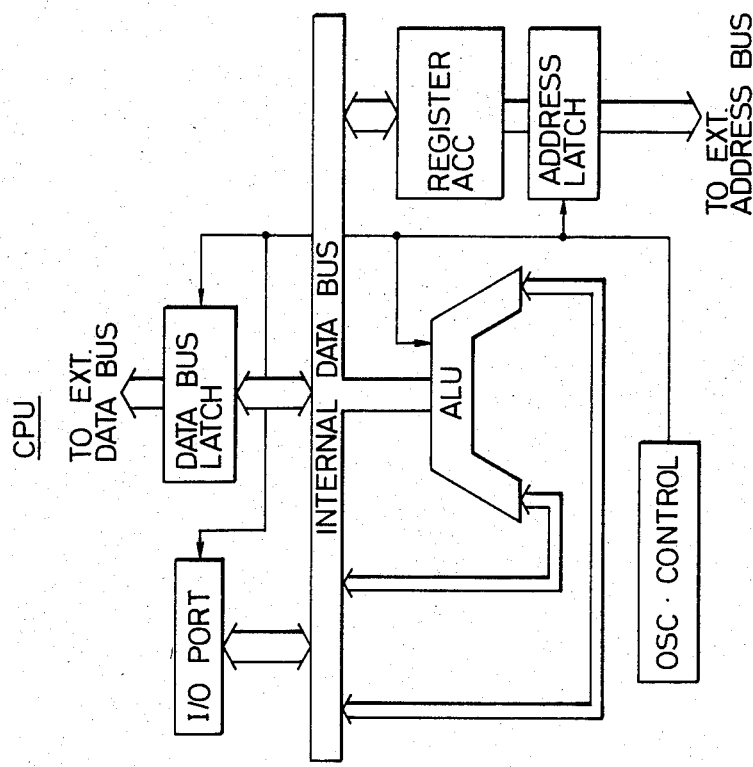

In FIG. 4-1 showing the details of the apparatus shown in FIG. 2, the image processor 15 consists of CPU, ROM, RAM etc. which may be, for example, a known microcomputer. ROM has a program as shown in FIGS. 5-1 and 5-2 stored therein. By executing the program, the above described process of processing image data is controlled. Data buses shown in FIG. 4-1 correspond to those designated by A-G in FIG. 2. The address buses are lines for setting addresses of the respective memories and the like. The coordinate input apparatus 9 is used to set positions for image processing. The input apparatus 9 may be a known digitizer or keyboard. Other input apparatus also may be used as the coordinate input apparatus 9 so long as it is able to indicate points on the coordinates. For example, a writing pen or a cursor on a Braun tube may be used.

RAM1 is an image area memory for storing data (X1, Y1) (X2, Y2) indicative of the position and area of the read image in the memory 4. RAM2 is a memory for storing data (X'1, Y'1) (X'2, Y'2) indicative of the position and area for reproduction of said read image. RAM3 is a memory for storing data (X3, Y3)(X4, Y4) indicative of the position and area of the sentence image in the memory 10. RAM4 is a memory for storing data (X'3, Y'3)(X'4, Y'4) indicative of the position and area for reproduction of said sentence image. Data in RAM4 is determined depending on the data in RAM2. But, it is also possible to determine the data in RAM4 by the input apparatus 9. Data in RAM1, RAM2 and RAM3 can be determined by the input apparatus 9. Memories 4, 10 and 11 are refresh type DRAM (dynamic RAM) memories.

FIG. 4-2 shows a concrete example of CPU shown in FIG. 4-1. The concrete example is the structure of HMCS 68000 supplied by Motorola or Hitachi. The structure is described in detail in its manual and therefore need not be described herein.

The manner of operation of the shown above apparatus will be described hereinafter with reference to the flow chart shown in FIGS. 5-1 and 5-2. The flow described hereinunder is the program stored in ROM in FIG. 4-1.

The image reader reads an original document (1) and the read image is stored in the image memory 4 as image data (2). On the other hand, the position data of the necessary image portion (X1, Y1)(X2, Y2) are introduced into the apparatus by the coordinate input apparatus 9 (3). To make the position data correspond to the original, the input of position data may be achieved by placing the original on a digitizer and plotting the apexes of the desired area. The position data is provisionally stored in the image position information area data memory RAM1 within the image processor 15 shown in FIG. 4-1. If the input of position data is not carried out using a digitizer but by using a keyboard, then the position $X_i$, $Y_i$ may be set also by previously making a correspondence between actual size and key input value. The input of position data can be carried out before or after reading the original image. When a standardized image is read or when an image in the same position is read many times repeatedly, such image may be stored and fixed in ROM.

The image memory 4 comprises a semiconductor memory using a dynamic RAM. To store all of the sizes in A4 format as digital values, the image memory 4 has a capacity of $210 \times 297 \times 16 = 997,920$ bits provided that it has a resolving power of 16 pel/mm bit density for 210 mm (length) $\times$ 297 mm (width). To set $X_i$, $Y_i$ positions of the original 1 from among the memory, CPU carries out address setting of the image memory (area coordinate→address conversion). Reading and writing of the image are conducted by the address. The correspondence between the memory address and positions $X_i$, $Y_i$ is obtained by computing the memory address corresponding to the previously plotted $X_i$, $Y_i$ within CPU. Let $X_i$ be 210 mm in length. Then, the width of address data values to be set will be 0–3360 bits. Similarly, when $Y_i$ is 297 mm in width, the width of address data will be 0–4752 bits. Therefore, the CPU issues address values up to 997,920 to set the address for the combination of $X_i$ and $Y_i$. The address conversion and image data transferring described above are executed at steps after step 11. While, in this example, the position of the original has been stored in data RAM in terms of $X_i$, $Y_i$, it is also possible to use means for converting the size indicated by a digitizer into an image memory address and store the memory address in the data RAM keeping the correspondence between size and address. Furthermore, it is also possible to issue the address of $X_i$, $Y_i$ from CPU and convert it into memory address on the side of the image memory. To this end, the $X_i$, $Y_i$ address is previously entered through an address setting line of ROM by the address conversion circuit of ROM and an image memory address corresponding to the address input is previously given as ROM data.

At the next step 4, the word processor 12 produces a sentence which is to be combined with the read image (4). This is done by keyboard input. The arrangement of characters in the sentence is automatically determined in such manner as to allot an area other than the area of the read image to the sentence and suitably start a new line. Therefore, one need not worry about the form of the sentence. If it is a standardized sentence, then the sentence may be advantageously stored in the ROM or in a disk device to use it whenever necessary. There is no need of worrying about the arrangement irrespective of what image is to be compounded with the sentence. This is a particular advantage of the present apparatus.

The input character codes are converted into picture element data by a character generator within the word processor 12 and then transferred into the sentence memory 10 (5). The sentence memory 10 is of the same structure as the image memory 4 and is connected to CPU. However, since the sentence character do not require as high resolution as the image does, the sentence memory may be formed with a lower memory capacity than the image memory. To expand the produced sentence to determined positions as data, the position data of (X3, Y3)(X4, Y4) are put in by the coordinate input apparatus 9 (6). RAM3 shown in FIG. 4-1 stores the input position data as area data. The coordinate data of (X3, Y3)(X4, Y4) may be, of course, introduced even before the production of the sentence to expand the character data to the memory addresses corresponding to the set positions of the sentence memory during the production of the sentence. However, since the word processor ordinarily contains an indirect buffer memory therein to assure easy production of the sentence, it is the best way to carry out the input of the coordinate data after producing the sentence.

At the step 5 subsequent to the production of the sentence, the input of the position data (X'1, Y'1)(X'2, Y'2), (X'3, Y'3)(X'4, Y'4) for arranging the image and the sentence is executed. The image position data is stored in RAM2 and the sentence position data is stored in RAM4. To prevent the image data and the sentence data from overlapping each other on this position setting, CPU operates on the area data of RAM2 and RAM4 to perform an automatic alteration of sentence position (8), (9). To this end, Y'2 of the converted position data of the read image in RAM2 is compared with Y'3 of the character image (8). Only when Y'3 is larger than Y'2, that is, the character image position lies out of the area of the read image, the step is directly advanced to the step of transferring image data. If it is detected that Y'3 is smaller than Y'2, that is, the character image position lies within the area of the read image, then Y'3 is subtracted from Y'2 and the amount of the line corresponding to the difference is registered in a register A. Further, the data in A is is added to Y'3 so as to produce the location at which a new line is started with shift-down of the line by A.

After completing the above step, CPU converts (X'1, Y'1) of RAM2 into an address and indicates the address to the edited data memory 11 to instruct the start point of image data writing. Then, the image data value at the position indicated as the address of (X1, Y1) in RAM1 is transferred from the image memory 4 to the edited data memory 11 at the indicated start point. This operation is repeated up to the address of (X2, Y2) to perform the necessary image extraction and position alteration. In this manner, only the image part is transferred into the edited data memory 11 (in Steps 11–17). More particularly, these steps are carried out in the following procedure:

At first, data of (X1, Y1) in RAM1 is transmitted to the register A of CPU (Step 12). A discrimination is made as to whether or not the content of the register A is equal to (X2, Y2) (Step 13). When it is not, the content of the register A is converted into address data and transferred to a register B according to the method illustrated in FIG. 5-2 (Step 14). Data of X'1, Y'1 in RAM2 is also converted into address data and transferred into a register C (Step 15). Then, the image data indicated by the register B is transferred into the address of memory 11 indicated by the register C (Step 16). 1 is added to X1, X'1 and also upon the end of one line address conversion 1 is added to Y1, Y'1 (Step 17). These data (X1, Y1)+1, (X'1, Y'1)+1 are transferred into the register A and a discrimination is made as to whether or not the content of the register A reaches X2, Y2 (Step 13). If not, the above procedure is repeated until it reaches X2, Y2. When it reaches X2, Y2, CPU carries out address conversion of (X3, Y3) at RAM4 similarly to the above and indicates the address to the edited data memory 11 as the starting point of sentence data writing. Data RAM3 takes up the sentence data value at (X3, Y3) address from the sentence memory 4 and transfers it into the edited data memory 11 at the indicated starting point. This operation is repeated up to the address of (X4, Y4) and only the sentence part is transferred into the data memory while carrying out the necessary alteration of the sentence position (Steps 18-23). The conversion routine shown in FIG. 5-2 is carried out starting from the top on the left side of the memory as (Xi, Yi)→0 and along the arrow keeping the correspondence to addresses as shown in FIG. 5-3.

The respective memory outputs are combined by OR logic and put into the edited data memory 11. Therefore, the content of the memory appears as that shown in FIG. 3. In this manner, a composition an image and a sentence is attained. To prevent any overlap of memory addresses, a selection of memory is made by changeover of the select terminal by select lines. Before starting the operation (at the program start step), all of the data in the edited data memory 11 are cleared. Therefore, there remains only background data (for example, 0) for the area other than the image and sentence portions as defined by FIG. 3C. Thus, there can be formed a white or a black background part by the background data.

Obviously many modifications and variations of the above embodiment are possible in the light of the above teachings.

In the above example, the data area of the image and sentence before and after alteration of position have been determined by setting position only. However, it is also possible to determine the data area by suitably setting the first point and the amount of data. Also, in the above example, the data area before alteration of position and that after alteration of position have been the same. However, it is also possible to change the data area. While the position of character image has been automatically determined by indicating the final arrangement of the read image, it is also possible to automatically determine the position of the read image by indicating the position of the sentence. Further, even when a sentence is arranged between two image parts, the position of the sentence in such arrangement can be determined automatically by the computing operation of the CPU. In this case, sentence data in RAM4 are so constituted as not to interfere with the read image. To this end, CPU subtracts the size in the Xi-direction of the image part from the full width in the Xi-direction and at the same time calculates the remaining width of the sentence part to make a new line start position at the most suitable point.

As readily understood from the foregoing, the present invention permits compounding of image data and character data. Since a word processor is used to produce sentence data and the sentence data exist as character codes of the respective characters constituting the sentence (for example, the JIS key code etc.), rearrangement of a sentence, insertion of a word, correction of an incorrect word, line shift etc. can be carried out at will. This makes it possible to arrange the sentence in the area other than the area for the image part with a higher efficiency when editing a combination of image data and character data. It also permits easy arrangement of the sentence in a place easy to see. Further it has another advantage that a communication circuit can be used as a data transmission line for data from the word processor. Therefore, image processing can be carried out using sentence data from a word processor at a remote place.

In the above description with reference to the FIG. 2 embodiment, the external sub-memory 5 has been shown and described as a memory used only for image data. However, it will be apparent that the external sub-memory may be used for storing character data when a large amount of character data are transferred from the word processor all at once. In this case, the image processor processes the data as character code correction of characters and rearrangement of a sentence can be carried out in the same manner as described above because the external sub-memory can store the data as character code data. Therefore, this constitutes another embodiment of the invention.

Hereinafter, description will be made of an example in which two portions of the same original image are changed in arrangement and then printed. This example is described with reference to FIGS. 6A and 6B.

Figure 6A:
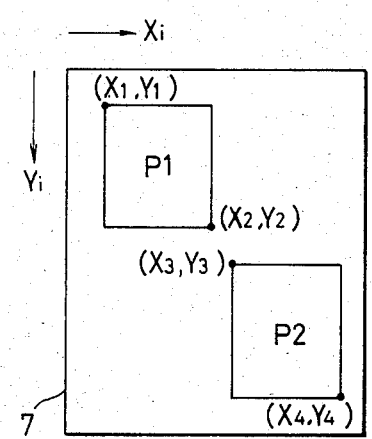
FIGS. 6A and 6B show another example of image edition.
Figure 6B:
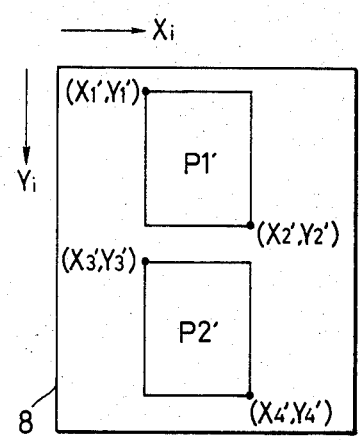

FIG. 6A shows an original to be processed. P1 and P2 are two different portions of the original. FIG. 6B shows a design of rearrangement to be obtained by image processing of the original shown in FIG. 6A. P1' and P2' correspond to P1 and P2. But, the arrangement of P1' and P2' is different from that of P1 and P2. In this example, therefore, it is desirable to shift the image portions P1 to P1' and P2 to P2'.

The image area of the portion P1 is defined by (X1, Y1) and (X2, Y2) with the left and upper apex being taken as a point of origin. Similarly, image area of P2 is defined by (X3, Y3) and (X4, Y4). In FIG. 6B, the image area of P1' after rearrangement is defined by (X'1, Y'1)(X'2, Y'2) and that of P2' by (X'3, Y'3)(X'4, Y'4). The images are printed in the position shown in FIG. 6B.

The image reader 3 previously described reads the original to be image processed and puts out image signals in the form of digital signals into the data bus B (FIG. 2).

The image memory 4 (first image memory) receives the signals and stores the read image data as "0" for a white portion and as "1" for a black portion in accordance with the image positions of the original.

The image processor 15 carries out coordinate-address conversion for all or a desired portion of the image data in the memory 4. The address converted data are transferred into the memory (second memory) 11 which stores the data. The image area stored in the first memory and the image area stored in the second memory are shown in FIGS. 6A and 6B respectively. As the first and second memories 4 and 11 there are used semiconductor RAMS. Therefore, data transfer can be carried out at a high speed. In particular, by employing a DMA system of a CPU, a high speed data transfer can be carried directly from the data bus E.

Since the image shown in FIG. 6A is that stored in the first image memory 4 shown in FIG. 2, the image data in the memory 4 corresponds to the image portions P1 and P2 enclosed by the corresponding position coordinates in FIG. 6A. Similarly, the image data in the second memory 11 corresponds to the image portions P1' and P2' in FIG. 6B.

The position coordinates data Xi, Yi of these P1, P2, P1' and P2' areas are by display 8, digitizer 9 and image processor 15 and stored in RAM1–RAM4 as shown in FIGS. 2 and 4 in the procedure shown in FIG. 5. In the case of this example, the control flow can be realized by omitting steps 4–6 in FIG. 5-1 and adding the steps of input discrimination of (X3, Y3) (X4, Y4) and RAM setting to step 4. Following the above steps, coordinate-address conversion and image data transfer are carried out in the same manner as described above so that the images P1, P2 in the first memory are transferred into the second memory 11 as images P1' and P2'. A copy as shown in FIG. 6B is obtained by sequentially putting out the image data from the memory 11 to the printer 7.

As described above, when two image memories are used, namely a first image memory for storing, at high speed, the read image data of an original to be processed and a second image memory for spreading the processed image data, rearrangement, deletion and addition of images can be carried out without the aid of any external memory. Therefore, a further improvement of data transfer speed and processing efficiency can be attained.

As another embodiment, two image memories can be used together with an external memory 5 in FIG. 1. In this embodiment, data are extracted from the external sub-memory 5 while making reference to the image data in the first image memory 1 and the image data are spread in the second image memory 2. In this manner, the use of two image memories makes it possible to perform reference image processing and further improve the efficiency of image edition.

The capacity of image memory is never limited to that of two pages only. The image memory can be provided with a higher capacity of more than two pages if desired.

According to the method of the present invention, a plural number of images can be printed serially. An example of such printing is described hereinafter with reference to FIGS. 7 and 8-1 and 8-2.

Figure 7:
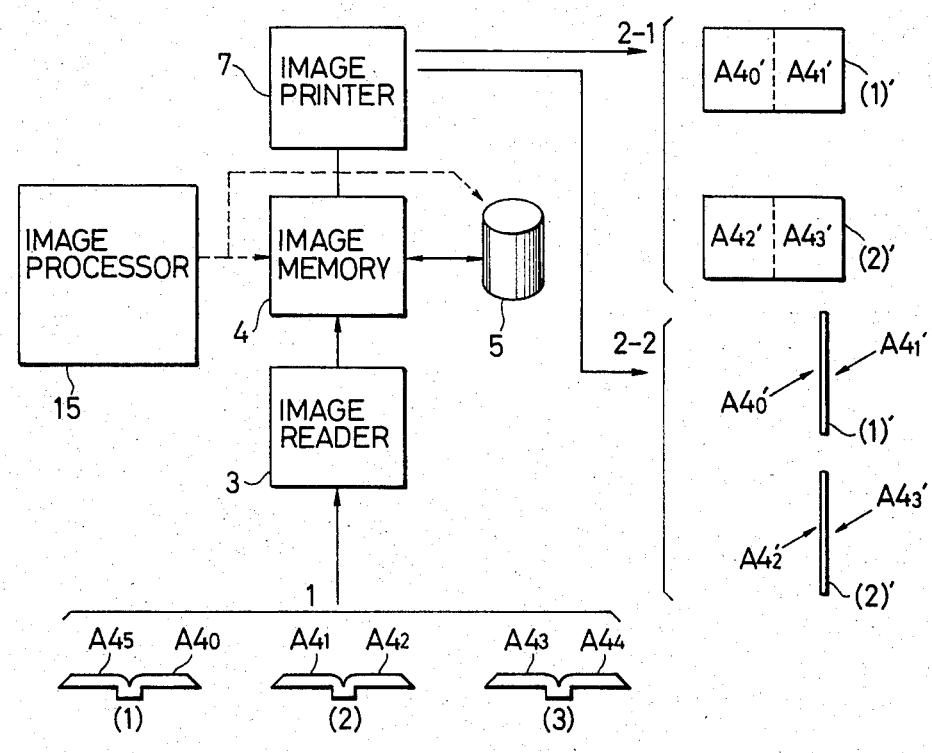
FIG. 7 shows a further example of image edition.

In FIG. 7, books (1), (2) and (3) are laid on a table with their pages $A4_0$–$A4_5$ open. The image reader 3 reads these pages of books (1), (2) and (3). The read original images are transferred into the image memory 4 which is able to store an amount of data equal to two pages in A4 format at one time as A3 format size. The external sub-memory 5 stores the read original for a long time as a data file in one page unit. From the external sub-memory, data can be extracted in page units whenever necessary. The image processor 15 can process the necessary two page images for composition. It compounds data of one page in the external sub-memory 5 and data in the image memory 4 or compounds data of two pages in the external sub-memory 5, and then puts out the compound images serially. The image printer 7 sends out the composition-processed content of the image memory 4 serially to record it on a paper of A3 format. 2-(1)' and (2)' are records thus obtained. The record 2-(1)' is a recording paper of A3 format having images of ($A4_0'$, $A4_1'$) and the record 2-(2)' is that having images of ($A4_2'$, $A4_3'$). $A4_0'$ means a copy of the page $A4_0$ of the book 1-(1). The same applies to other similar symbols.

At first, pages $A4_0$ and $A4_5$ of book 1-(1) are read by the image reader 3. The read original is transferred into the image memory 4 as image signals. $A4_0$ and $A4_5$ are registered at the areas $M_1$ and $M_2$ of the image memory 4. The content of image memory 4 is transferred into the external sub-memory 5 after a file number is affixed to every page by the image processor 15.

The above operation is repeated also for book 1-(2) and 1-(3) to form a data file of the book 1 in the external sub-memory 5. After completing the repeating operation, the image processor 15 transfers the first stored data of page $A4_0$ from the external sub-memory 5 to the image memory 4 at its area M1. Similarly, the next data of page $A4_5$ is transferred to the next area M2 of the image memory 4. The data in the image memory 4 are serially sent out to the image printer 7 so that a record as shown in 2-(1)' is obtained. In the same manner, pages $A4_2$ and $A4_3$ are copied to form a record 2-(2)'.

As seen in FIG. 7, the record of 2-(1)' having $A4_0'$ and $A4_1'$ and the record of 2-(2)' having $A4_2'$ and $A4_3'$ are each contained on one paper sheet of A3 format.

Figures 1, 8:
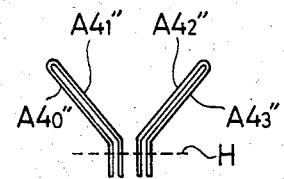
Figures 2, 8:
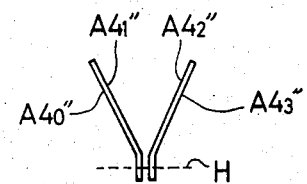

The copied originals are folded back along the center line of each the sheet with each page upward and bound at H as shown in FIG. 8-1.

When the bound records are opened wide, $A4_1''$ is on the left-hand side and $A4_2''$ is on the right-hand side, which is entirely the same as the original 1-(2) (FIG. 8-2).

According to the above embodiment, original images can be copied maintaining the same arrangement of pages as in the original book and with good efficiency. Thus, a copy easy to see can be provided.

In addition, it is possible to correct any misarrangement of pages in the original or insert any relevant page extracted from the file.

Figure 10:
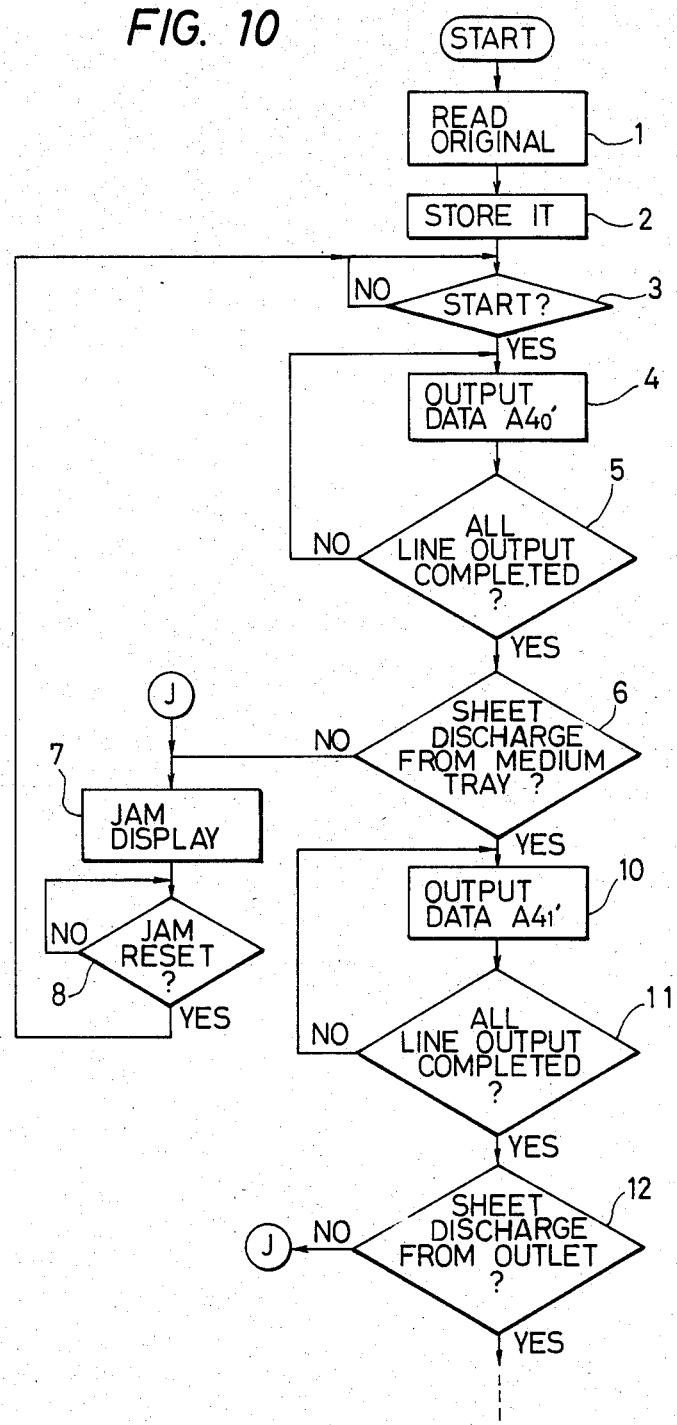
FIG. 10 is a flow chart of the control for the example shown in FIG. 7.

The process control necessary for obtaining the above mentioned copies can be carried out according to the flow chart shown in FIG. 10 (later described) with the exception that the steps 6 and 9 are replaced by a time delay step for providing a margin to fold back on the copy sheet. More particularly, data of $A4_0'$ are put out from the memory 4 (4) and a discrimination is made as to whether or not all line output in one page amount of $A4_0'$ is completed (Step 5). If not, the output is repeated until all line output is completed. This discrimination can be performed by line counting 210 mm × 16 pel/mm by the image processor 15 and detecting the end of the count. Upon completion of output of one page of data, a predetermined blank time is given and thereafter data output from the memory 4 is carried out (Steps 10, 11). Thus, a copy of two pages can be obtained on one copy sheet of A3 format with a margin to fold back between the images $A4_0'$ and $A4_1'$.

The method of the present invention is applicable also to such case wherein an image is formed on both sides of one copy sheet.

Before describing an example of such two side copying, we will describe an example of a copying machine provided with an image printer 7 which is applicable to all of the above examples.

Figure 9:
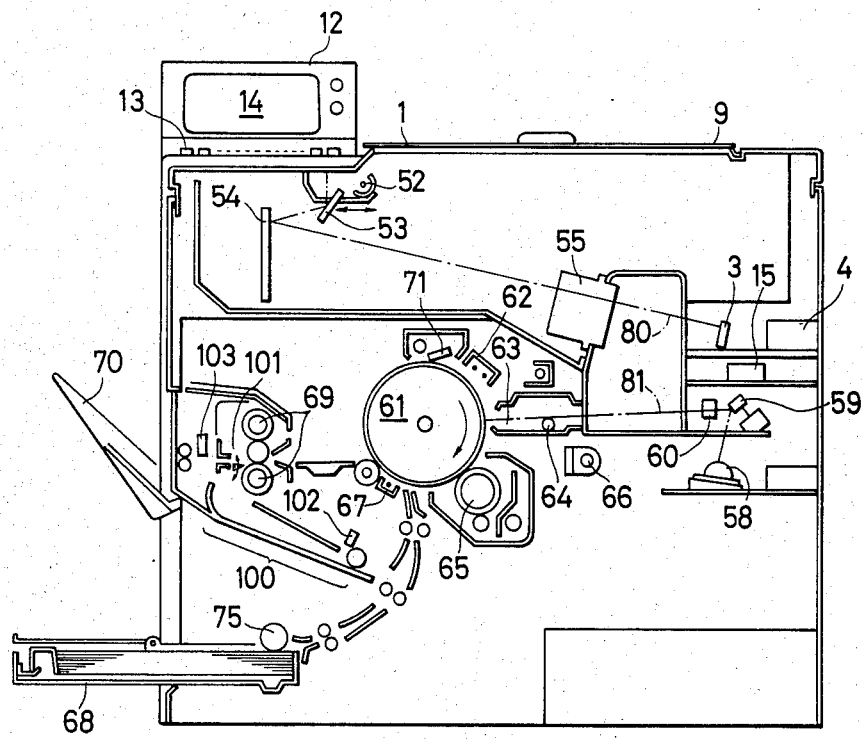
FIG. 9 is a sectional view of a copying machine to which the present invention is applicable.

In FIG. 9, there is shown such an example of a copying machine. An original laid on a platen 1 is illuminated by a lamp 52 and scanned by mirrors 53 and 54 moving in the direction of the arrow. 80 designates a reflected image formed by the slit scan. The reflected image 80 forms an image on the photoreceptor part of a CCD 3 through a lens 55. The image is converted into an electrical signal at every slit line by self scan of the CCD and stored in a memory 4 through a buffer in the manner described above. In response to an output start signal, data are read out from the memory 4. Through a buffer the read data modulates a beam 81 from a laser oscillator 58. The beam is deflected upon a polygonal mirror 59 to beam scan a rotating photosensitive drum 61. Thus, an electrostatic latent image is formed on the drum. The electrostatic latent image on the drum is developed by a developing device 65 and the developed image is transferred onto a sheet in A3 or A4 format fed from a cassette 68. The image on the sheet is then fixed by a set of rollers 69. The sheet is discharged from the machine into a tray 70. The drum is cleaned up by a cleaner 71 for reuse. When a two side copy is desired, a pawl 101 is turned up on completing the copy on the first side of the sheet so that the fixed copy sheet is not discharged from the machine but is transported to an intermediate tray 100 for waiting. With the start of beam scan on the image of the next page, the sheet is sent out from the intermediate tray 100 in a determined timing to transfer the image of the next image onto the second side of the sheet from the drum. Until this point in time, the pawl 101 is again turned down to its original position.

Hereinafter, the manner of control on a two side copying process will be described with reference to FIGS. 7-10. The steps shown in the flow chart of FIG. 10 are executed by the image processor 15 shown in FIG. 2.

As previously described, each page of a book 1 in A4 format is read and the read original data are stored in the memory 5 as a data file (Step 1), (Step 2). After the above operation, discrimination is made as to whether or not the data stored is completed or as to whether or not the start signal is issued (Step 3). When the start signal has issued, indicated by "Yes", the first stored $A4_0$ page data is transferred to area M1 of the image memory 4 from the external sub-memory 5. Similarly, $A4_1$ page data is transferred to the next area M2 of the image memory 4. Among data in the image memory 4, data at M1 is at first sent out to the image printer 7 (Step 4), (Step 5) to print it on the top side surface of a copy paper of A4 format. The copy sheet carrying a print on its top surface is transported to the intermediate tray 100 where the copy sheet is turned inside out. The reversed sheet is again sent out from the intermediate tray 100 toward the transfer station. The image processor 15 discriminates whether the copy sheet is discharged from the intermediate tray or not by means of a sheet sensor 102 (Step 6). After confirming the sheet discharge from the tray 100, data at M2 of the image memory 4 is transferred to the image printer (Step 10), (Step 11) to print it on the backside surface of the copy sheet. Thus, there is obtained a two side copied record as that shown at 2-2-(1)' in FIG. 7. If no sheet discharge from the intermediate tray 100 is detected, it is regarded as occurrence of a jam (Step 7) and copying operation is inhibited until a jam reset key is turned on (Step 8). Upon resetting, output of data $A4_0'$ is again started to repeat copy making on the top side of copy paper. At step 12 a discrimination is made as to whether or not the copy sheet already copied on the two sides is jammed, by means of a sheet sensor 103.

If no sheet is detected at the time when output of data at M2 is completed, then the step is turned toward jam routine J. After jam resetting, data output of $A4_0'$ is again started to continue printing. When a sheet discharge from outlet is detected, data of the next two pages are transferred from the file memory 5 to the image memory 4. In the same manner as above, pages $A4_2$ and $A4_3$ are copied to produce a record as that of 2-2-(2)' in FIG. 7. The records (1)' and (2)' of 2-2 thus obtained are bound together at H as shown in FIG. 8. When the bound records are opened wide, the image $A4_1''$ is on the left-hand side and $A4_2''$ is on the right-hand side. This arrangement of pages is entirely the same as that of the original 1-(2).

In this manner, a copy having the same page arrangement as that of the original can be obtained without need of folding work. Such copy is very easy to see. Many variations of the above embodiment are possible. In the above embodiment, at the first reading step, page $A4_0$ and page $A4_5$ of the book original 1-(1) have been read at one time. After reading, the image data have been sent out from the image memory to the image printer while separating one page from the other page. However, it is also possible to carry out a copying operation with every reading and to carry out page arrangement in synchronism with the operation of the intermediate tray. Further, it is possible to carry out printing on the first surface of a copy sheet in synchronism with reading while storing only one page data for the second surface thereof in the image memory 4.

What I claim is:

1. An image processing method comprising the steps of:
   entering document image data;
   generating character image data;
   controlling storage of said document data and said character data in a memory in such a manner that one of said document image data and said character image data is stored in an area of said memory and the other of said document image data and said character image data is automatically arranged to be stored in a different area of said memory; and
   reproducing an image on the basis of the data stored in said memory.

2. An image processing method according to claim 1 wherein said controlling step comprises determining a memory location for said character image data depending on the memory location in which said document image data is stored when said document image data is stored first.

3. An image processing method according to claim 1, wherein said reproducing step includes printing the image on the basis of the data stored in said memory.

4. An image processing apparatus comprising:
   means for entering document image data;
   means for generating character image data;
   a memory for storing document image data and character image data;
   means for controlling storage of said document image data and said character image data in said memory in such a manner that when either one of said document image data and said character image data is stored in one area of said memory, the other of said document image data and said character image data is automatically arranged to be stored in an area of said memory other than said one area; and
   means for reproducing an image on the basis of the data stored in said memory.

5. An image processing apparatus according to claim 4, wherein said entering means operates to enter document image data from a desired area on a document.

6. An image processing apparatus according to claim 4, wherein said generating means comprises character input means for providing sentence information.

7. An image processing apparatus according to claim 4, wherein said controlling means stores document image data and character image data in different areas of said memory.

8. an image processing apparatus according to claim 4, wherein said reproducing means includes printing means for printing the image on the basis of the data stored in said memory.

9. A copying method comprising steps of:
reading a document image and generating document image data representing the document image;
storing the document image data representing a plural number of documents in a memory; and
putting out serially the document image data representing the plural number of documents from said memory; and;
forming images of the plural number of documents on a single sheet on the basis of the document image data serially put out from said memory.

10. A copying method according to claim 9, further comprising the step of supplying a sheet having area two times as big as a document.

11. A copying method according to claim 9, wherein in said forming step, the images of the plural number documents are formed on the same side of the single sheet.

12. A copying machine comprising:
means for reading a document image generating image data representing the document image;
means for storing a plural number of document images represented by the document image data generated from said reading means;
means for serially putting out the document image data representing a plural number of document images from said storing means; and
means for forming images of the plural number of document images on a single sheet on the basis of the image data serially put out from said storing means.

13. A copying machine according to claim 12, wherein said putting out means puts out the image data read from two document images to form the read image data on one of the surfaces of a sheet that has an area two times as big as a document.

14. A copying machine according to claim 12, wherein said forming means is operable to form the images of the plural number of document images on the same side of the single sheet.

15. An image forming apparatus comprising:
a memory for storing document image data;
means for putting out document image data from said memory;
means for feeding a sheet for receiving an image;
means for forming an image on a sheet fed by said feeding means on the basis of the image data put out from said memory by said putting out means; and
means for controlling said putting out means in accordance with feeding of a sheet by said sheet feeding means so as to cause said forming means to form an image at a predetermined location on said sheet.

16. An image forming apparatus according to claim 15 wherein said memory stores image data from a partial area of a document.

17. An image forming apparatus according to claim 15 wherein said controlling means controls said putting out means to form the image in a location on the sheet, which location is not associated with an image location on a document.

18. An image forming apparatus according to claim 15, further comprising reading means for reading the document image and generating the document image data representing the document image, the document image data generated by said reading means being stored in said memory.

19. An image forming apparatus comprising:
means for reading document image data representing documents;
memory means for storing the read document image data representing a plural number of documents;
means, including an image forming station, for forming images on a sheet at said image forming station;
means for putting out document image data representing the plural documents serially from said memory means to said forming means;
means for feeding a sheet to said image forming station to form an image on one side of said sheet; and
means for refeeding said sheet on the one side of which the image has been formed to said image forming station to form another image on the other side of said sheet.

20. An image forming apparatus according to claim 19 wherein said refeeding means has an intermediate tray for reversing said sheet.

21. An image forming apparatus according to claim 19 wherein said putting out means operates in synchronism with sheet feeding by said feeding means and said refeeding means.

22. An image processing method comprising the steps of:
inputting document image data;
inputting sentence data;
reproducing a composite image comprising a document image based on input document image data and character images based on input sentence data; and
controlling reproduction of character images based on the input sentence data while changing the lines of the sentence to be reproduced in accordance with the reproduction location of the document image based on the input document image data.

23. An image processing method according to claim 22, further comprising the step of recording on a sheet the composite image of said document image and said character images.

24. An image processing method according to claim 22 wherein said controlling step permits the reproduction of the character images in an area other than the area in which the document image is reproduced.

25. An image processing method according to claim 24 wherein said controlling step differentiates the line changing operation in accordance with the amount of the sentence data and the reproduction area.

26. An image processing system, comprising:
means for entering document image data;
means for generating sentence data;
memory means for storing said document image data entered by said entering means and said sentence data generated by said generating means; and means for controlling storage of said document image data and said sentence data into said memory means in such a manner that said document image data and said sentence data are automatically arranged to be stored within a predetermined area of said memory means.

27. An image processing system according to claim 26, wherein said control means controls storage of said sentence data into said memory means in such a manner as to change said sentence data on the basis of at least one of a row and line thereof.

28. An image processing system according to claim 26, further comprising means for recording an image based on said data stored in said memory means.

29. An image processing system according to claim 26, wherein said document image data and said sentence data are stored in mutually exclusive areas in said memory means, respectively.

30. An image processing system according to claim 26, further comprising means for instructing the respective locations of the documents image data and the sentence data within the predetermined area of said memory means, wherein said control means controls the storage of the document data and the sentence data into said memory means in accordance with the instruction from said instruction means.

31. An image forming system, comprising:
means for reading a document image and generating document image data;
means for storing the document image data generated by said reading means;
means for serially putting out document image data for first and second document images read by said reading means, the document image data for at least one of said document images being derived from said storing means; and
means for forming said first and second document images on a single sheet on the basis of said serially put out document image data.

32. An image forming system according to claim 31, wherein said putting out means puts out the document image data read from two documents to form the document image data on one of the surfaces of a sheet.

33. An image forming system, comprising:
means for reading document image data;
memory means for storing the document image data read by said reading means;
means, including an image forming station, for forming images on a sheet at said image forming station;
means for putting out a plural number of document image data serially to said forming means, wherein at least one of said image data is retrieved from said memory means;
means for feeding a sheet to said image forming station to form an image on one side of said sheet; and
means for refeeding said sheet, on one side of which an image has been formed, to said image forming station to form another image on the other side of said sheet.

34. An image forming system according to claim 33, wherein said refeeding means comprises an intermediate tray for reversing said sheet.

35. An image forming system according to claim 33, wherein said putting out means operates in synchronism with sheet feeding by said feeding means and said refeeding means.

36. An image processing apparatus, comprising:
means for setting text;
a text memory for storing text data representing text set by said setting means;
means for reading an original document image to produce original document data representing the original document image;
designating means operable for designating respective positions for the composition of text set by said setting means and an original document image read by said reading means;
a composition data memory;
memory control means for storing text data and original document data at respective memory areas of said composition data memory, said memory areas corresponding to the composition positions designated by said designating means, said text data corresponding to that read out from a selectively designated area of said text memory, and said original document data representing a selectively designated part of the original document image; and
image forming means for forming an image in accordance with the data stored in said composition data memory.

37. An image processing apparatus according to claim 36, wherein said memory control means is adapted to arrange the text data read out from a part of said text memory in accordance with the composition position.

38. An image processing system comprising:
reading means for reading an original image to generate image data representing the original image;
storage means for storing the generated image data, said storage means having such a storage capacity that it can store the image data for more than two original images read by said reading means;
means for selectively deriving first and second image data, respectively corresponding to first and second original images which are to be reproduced, from image data which is stored in said storage means and which includes, in addition to said first and second image data, further image data representing at least one further image which can be reproduced by the system; and
recording means operable in accordance with the first and second image data derived by said deriving means for recording copy images only of said first and second or images on a single recording sheet.

39. An image processing system according to claim 38, wherein said recording means is arranged to record said copy images of both of said first and second original images on the same side of said recording sheet.

40. An image processing system according to claim 38, wherein said deriving means is operable to enter the derived first and second image data into an image data memory separate from said storage means, and wherein said recording means is operable in a recording mode to record said copy image in accordance with the first and second image data read out from said image data memory.

41. An image processing method comprising the steps of:
storing in a image data memory first and second image data defining respective image portions and derived from different data sources;
reading out from said image data memory composite data comprising said first and second image data; and recording a composite image comprising both said portions;

said image data storage step including a control step of automatically storing said first and second image data in said image data memory in such a manner as to arrange that the said image portions are not overlapped in said composite image recording step.

42. An image processing method according to claim 41, wherein the first image data is data derived from an original document.

43. An image processing method according to claim 41, wherein the second image data is data generated for character generation.

44. An image processing method comprising the steps of:

entering first and second image data derived from different data sources;

storing said first and second image data in a memory; and controlling the storage of said first and second image data in a memory in such a manner that one of said first and second image data is stored in an area of said memory and the other of said first and second image data is automatically arranged to be stored in a different area of said memory.

45. An image processing method according to claim 44, wherein the first image data is data derived from an original document.

46. An image processing method according to claim 44, wherein the second image data is data generated for character generation.

47. An image processing method according to claim 44, wherein said controlling step comprises determining a memory location for successive image data depending on the memory location in which last image data is stored.

48. An image processing method according to claim 44, further comprising the step of printing an image on the basis of the data stored in said memory.

49. An image processing method comprising the steps of:

entering first and second image data derived from different data sources;

reproducing a composite image of a first image based on said first image data and a second image based on said second image data; and controlling the reproduction location of one of first and second images in accordance with the reproduction location of the other of said first and second images.

50. An image processing method according to claim 49, wherein the first image data is data derived from an original document.

51. An image processing method according to claim 49, wherein the second image data is data generated for character generation.

52. An image processing method according to claim 49, wherein said controlling step permits the reproduction of one of said first and second images in an area other than the area in which the other of said first and second images is reproduced.

* * * * *